H. HAYNES.
Horse Rake.
No. 1,176. Patented June 18, 1839.
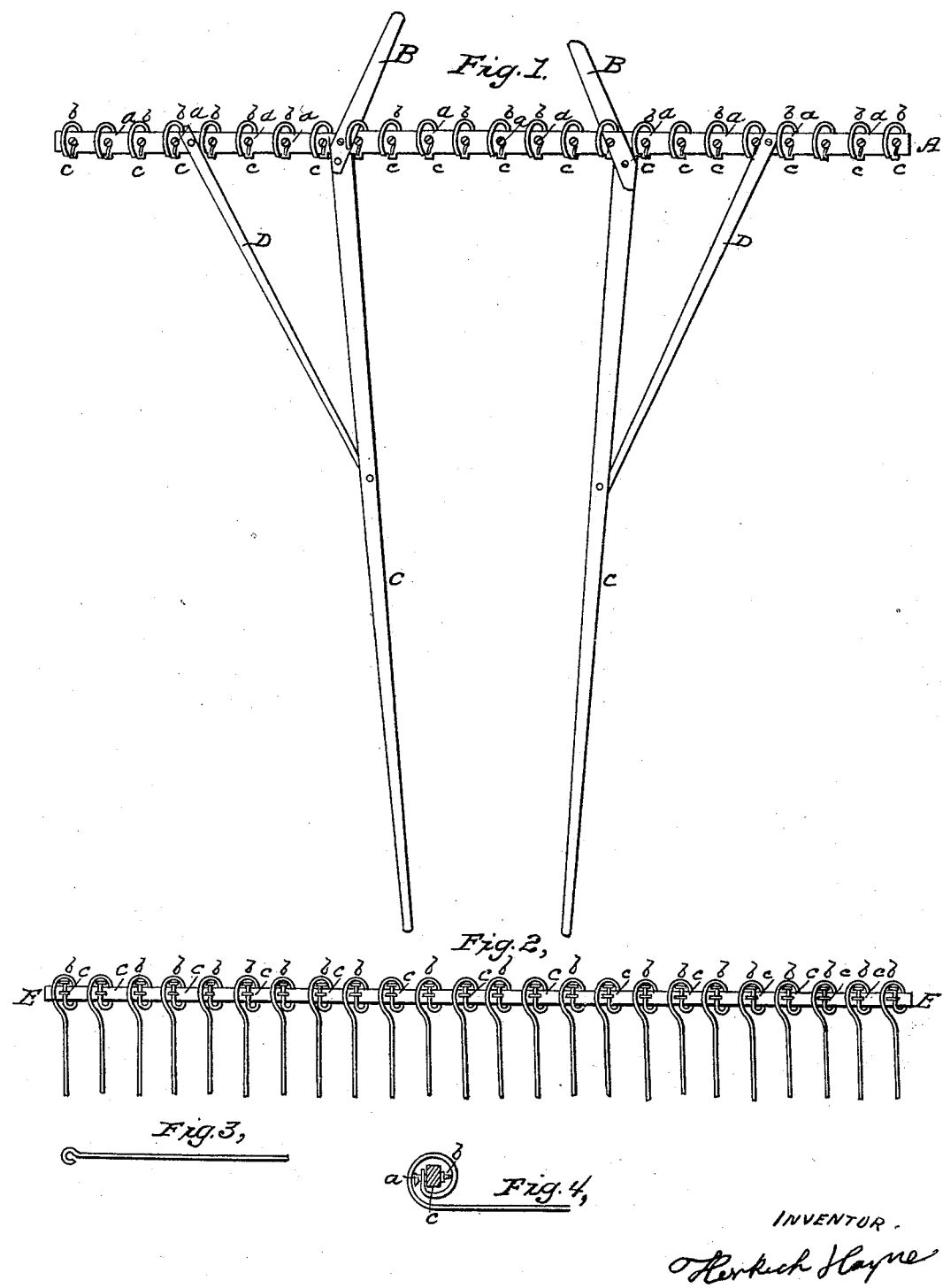

UNITED STATES PATENT OFFICE.

HEZEKIAH HAYNES, OF MIDDLETOWN, VERMONT.

IMPROVEMENT IN RAKES.

Specification forming part of Letters Patent No. 1,176, dated June 18, 1839.

*To all whom it may concern:*

Be it known that I, HEZEKIAH HAYNES, of Middletown, in the county of Rutland and State of Vermont, have invented a new and improved mode of constructing rake-teeth for all kinds of hay and grain rakes and other rakes used or employed in agriculture; and I do hereby declare the following is a true and exact description.

The nature of my invention consists in providing a set or series of circular elastic iron or steel spring-tempered teeth, which I apply to the common hand-rake, the horse-rake, and to all other rakes with fixed heads, used for raking hay, grain, and other agricultural purposes.

To enable others skilled in the art to make and use my invention, I will proceed to describe its construction and operation.

I construct a rake, excepting the teeth, in any of the known forms of hand-rakes for manual power, or of the larger rakes with thills for horse-power having fixed, not revolving, heads.

A convenient length for the head of a horse-rake (which may be increased or diminished) is ten feet by two and one-half inches in width, and one and one-half inch in thickness, to be made of spruce, bass-wood, or other sufficiently light and strong timber. Such a head is divided by the compasses into spaces of five inches, (see drawing Figure 1, *a a a*, &c., representing also the heads of the bolts,) and is bored at each division through the flat side of the head with holes sufficiently large to receive each an iron bolt one-fourth or five-sixteenths of an inch square. The bolts should be two and one half inches long, with stout flat heads, with screws and nuts on the other ends, for the purpose of fastening the teeth onto the head of the rake. The teeth are made of wire about five-sixteenths of an inch diameter and two feet (more or less as desired,) in length, on one end of which loops are turned, (see Fig. 3,) to receive the bolts. A tooth is then laid on the head of the rake, pointing forward, the bolt being passed through the loop and the head of the rake, to which it is made fast by the nut underneath. The tooth is then bent down, forward, brought back and under, and then over the head, so as to encompass it once and a quarter, leaving the long and straight end of the tooth pointing down before and at right angles with the lower or under side of the head. (See Fig. 4, end view of the head, with one tooth bended on in the manner just described.) The tooth must be so bended as when adjusted to its place it will, in its circular part, stand off from the head, excepting at the place of fastening, about half an inch from every surface of the head. In order to prevent side motion, and to maintain the teeth more exactly and permanently in place, a small staple is driven into the forward edge of the head, and astride of each tooth, (see *c c c*, &c., Figs. 1 and 2,) just below the point where it is first bent over the corner of the head. At the next division of five inches another tooth is in like manner made fast to the head of the rake, and so on until the series is completed and the head filled, as seen at *b b b*, &c., Fig. 2, or at *b b b*, &c., Fig. 1, where segments only of the teeth are represented. Thus twenty-four teeth will fill a rake-head ten feet long. It is, however, most convenient in constructing the teeth to bend them to their proper curves before putting them on and fastening them to the head. The size of the wire employed in constructing the teeth should be varied, of course, according to the power to be applied in using the rake, a much smaller wire sufficing when only manual power is employed.

Referring further to the drawings, Fig. 1 shows a bird's-eye view of a horse-rake, and the upper or curved ends of the teeth *b b b*, &c., segments only of a portion of them being shown in the drawings. A A is the head of the rake ten feet long and two and one-half inches wide; B B, the handles; C C, the thills; D D, the braces attached to the thills and head.

Fig. 2 is a front view of the rake-head, with the teeth fixed on and the thills and handles removed; E E, the head of the rake ten feet long, one and one-half inch thick, showing the front side of the head; *b b b*, &c., the teeth fastened to their places five inches apart; *c c c*, &c., the heads of the staples, (shown also at *c c c*, &c., Fig. 1,) driven astride of the teeth into the front side of the head.

Fig. 3 shows a wire for a tooth, with a loop to receive the bolt turned on one end.

Fig. 4 is an end view of the rake-head, with one tooth bent on and made fast by the bolt *a b; c*, the point at which the staples (*c c c*, &c., Figs. 1 and 2) are driven into the head outside of the teeth to prevent their side motion.

I do not claim to be the inventor of elastic wire teeth for rakes, this having been already done; but What I do claim as my invention, and desire to secure by Letters Patent, is—

The obtaining this elasticity more effectually for the use designed by coiling the wire of which the teeth are made around the head of the rake, in the manner and for the purpose herein described.

HEZEKIAH HAYNES.

Witnesses:
ARUS HAYNES,
JESSE GOVE.